Sept. 14, 1965     R. C. POSH     3,206,248
FOLDING SEAT
Filed Aug. 5, 1963     5 Sheets-Sheet 1
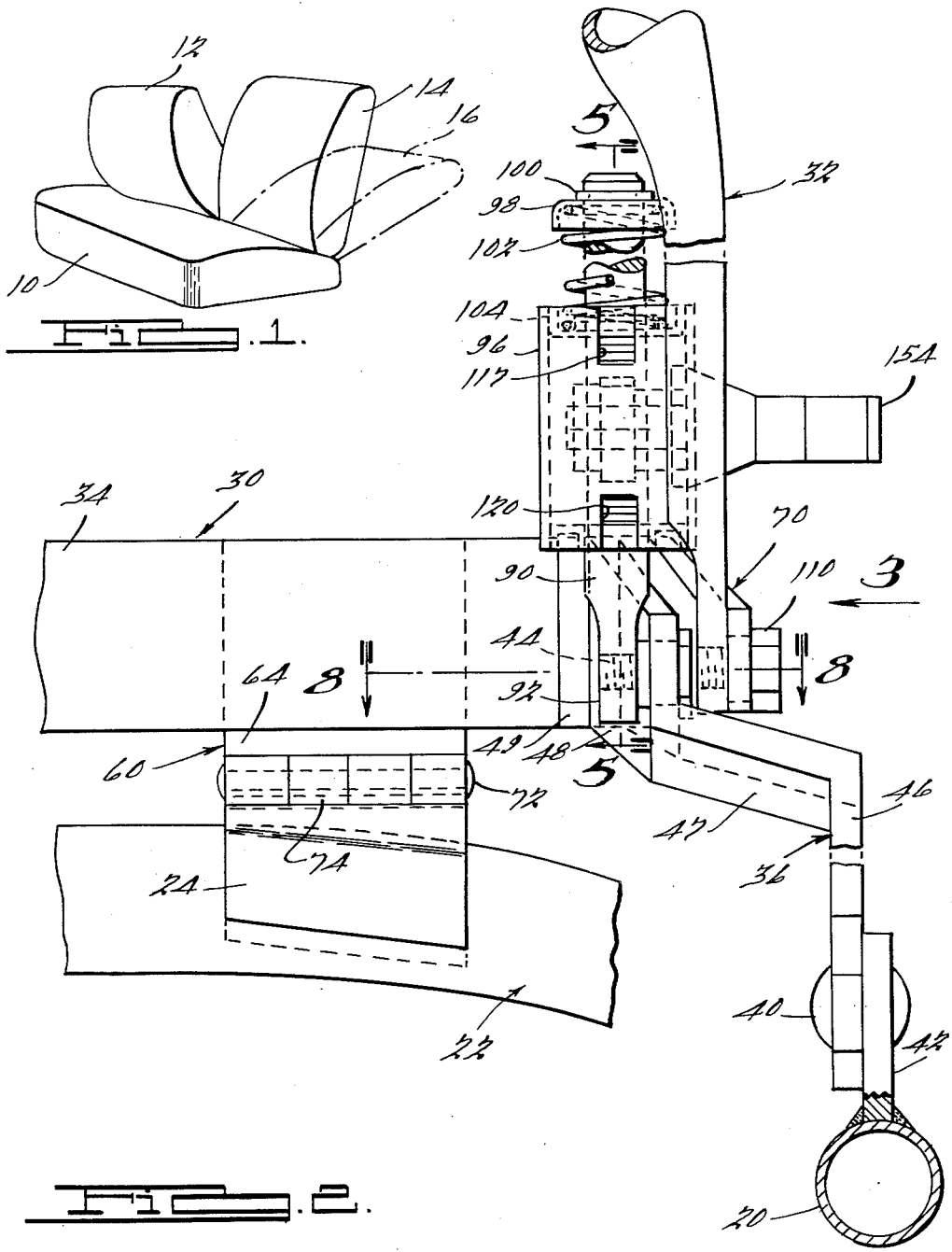
INVENTOR.
Raymond C. Posh.
BY
Barnard, McGlynn & Reising
ATTORNEYS.

Sept. 14, 1965    R. C. POSH    3,206,248
FOLDING SEAT

Filed Aug. 5, 1963    5 Sheets-Sheet 2

INVENTOR.
Raymond C. Posh
BY
Barnard, McGlynn & Leising
ATTORNEYS

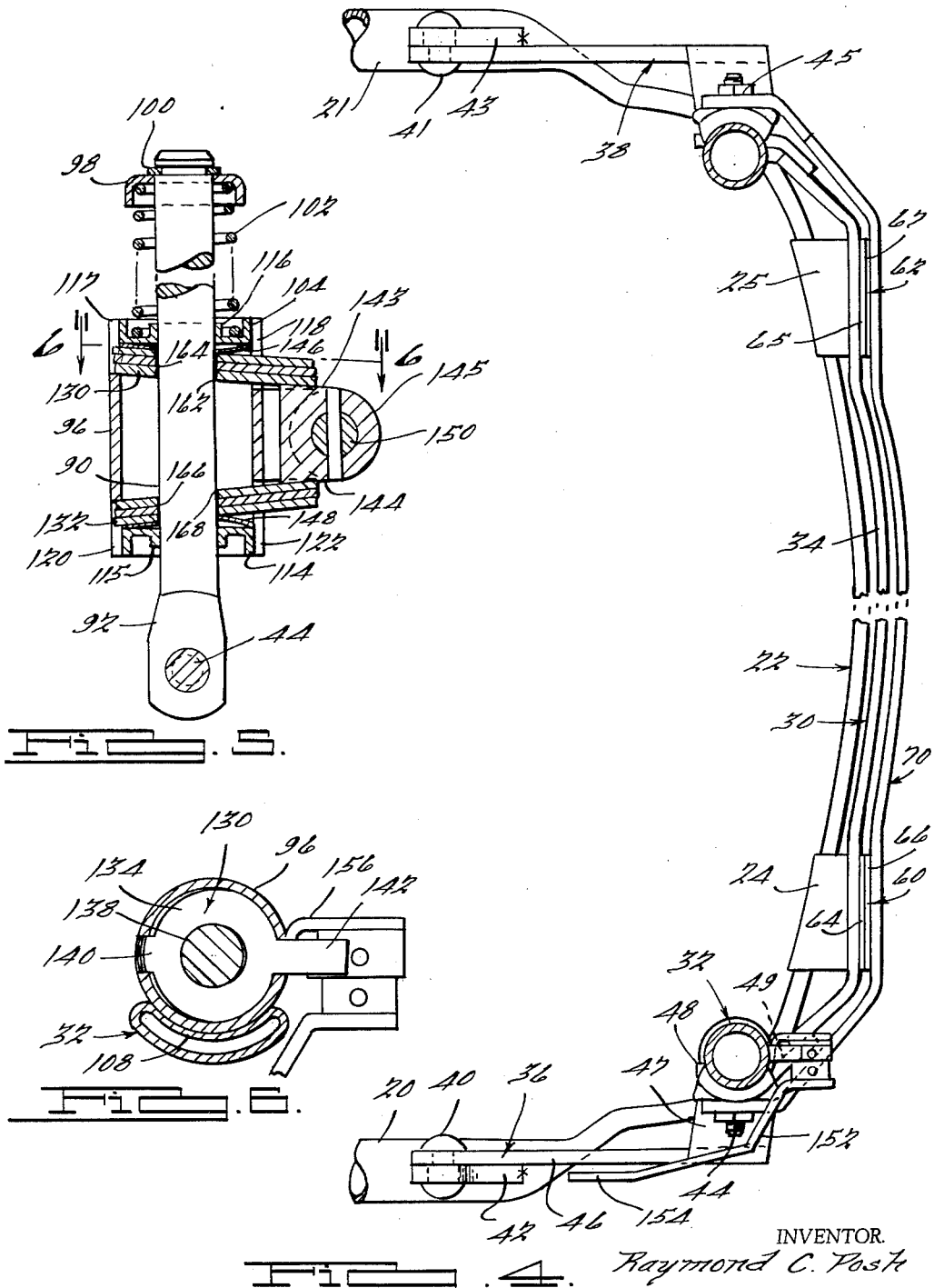

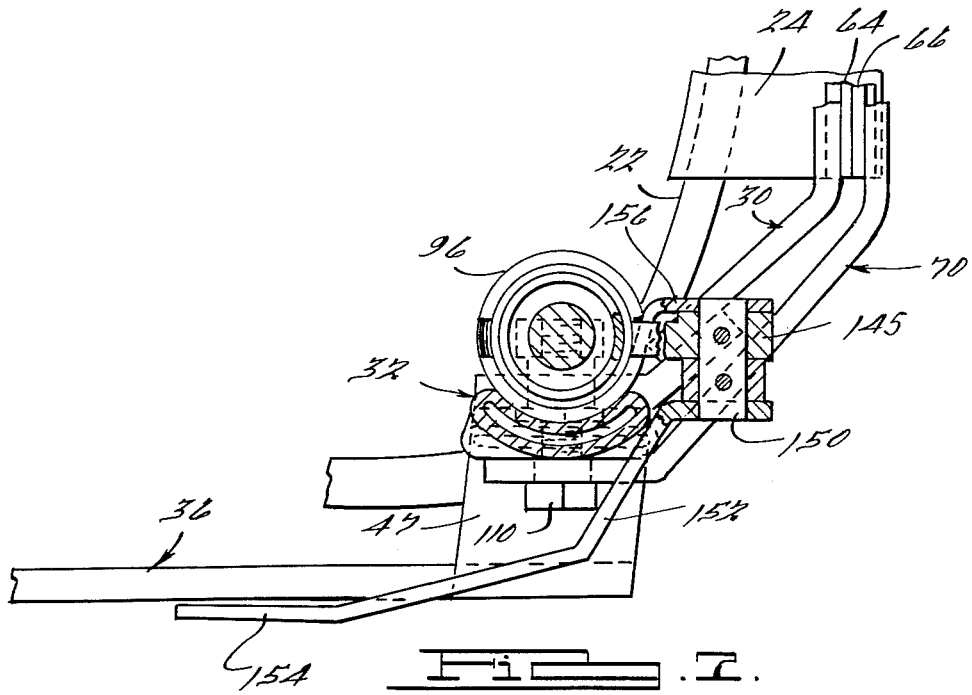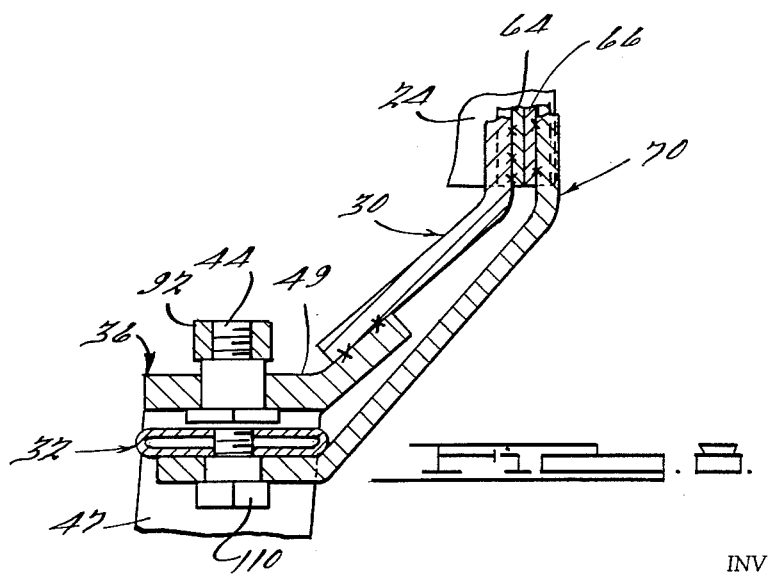

Sept. 14, 1965  R. C. POSH  3,206,248
FOLDING SEAT
Filed Aug. 5, 1963  5 Sheets-Sheet 5
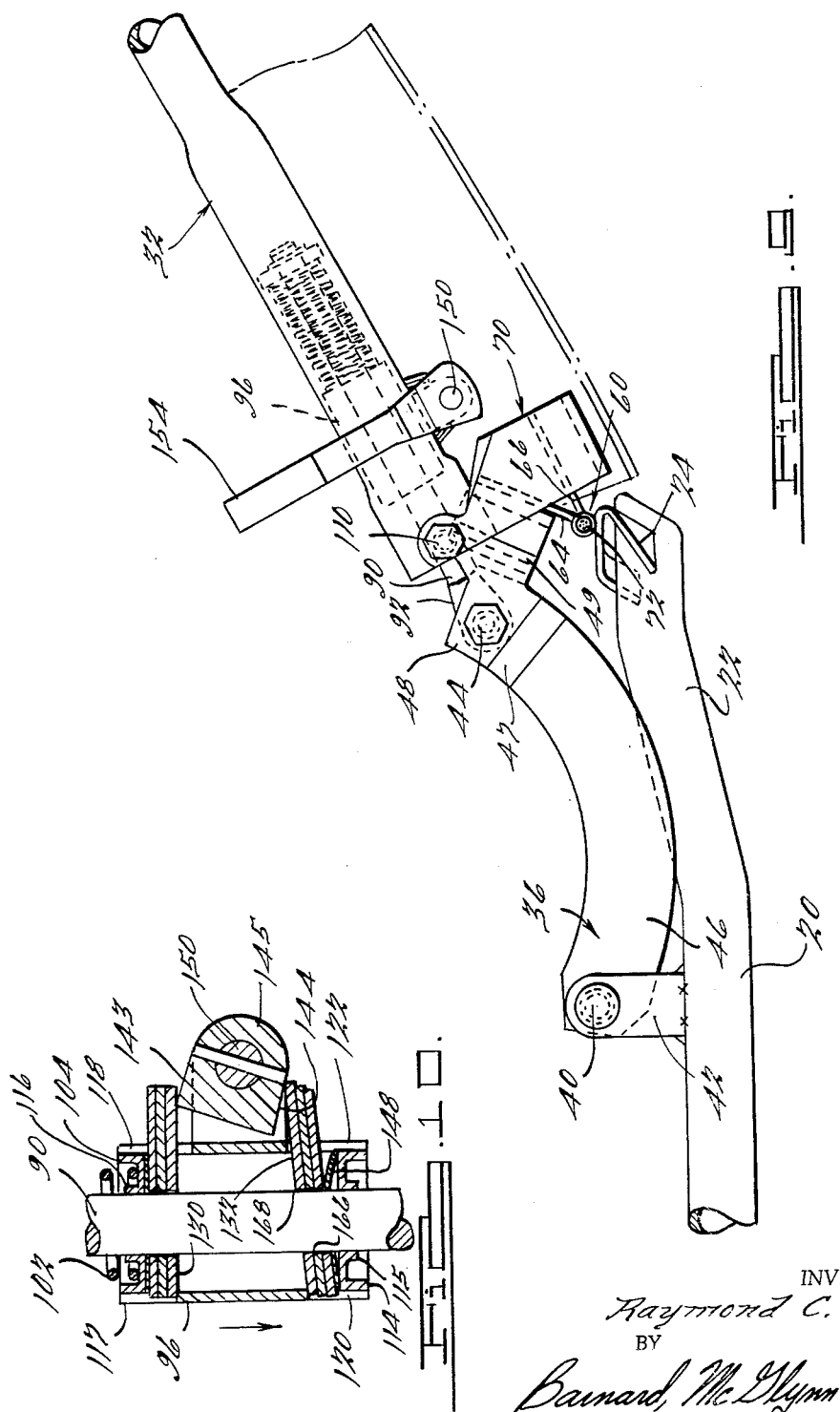
INVENTOR.
Raymond C. Posh
BY
Barnard, McGlynn & Leising
ATTORNEYS 3,206,248
FOLDING SEAT
Raymond C. Posh, Garden City, Mich., assignor to American Metal Products, Detroit, Mich., a corporation of Michigan
Filed Aug. 5, 1963, Ser. No. 299,941
18 Claims. (Cl. 297—374)

This invention relates to folding seats and more particularly to seats, for use in automotive vehicles or the like, which have pivotally mounted seat backs.

In many automobile designs it is conventional to provide seat backs which are movable from a normal upright seat-forming position to a forwardly folded position adjacent the seat cushion to provide for easy access to seating or storage space behind the seat back. In addition to being able to fold a seat back forwardly to provide for ready access to the space behind the seat, it is also often desirable to provide means to adjust the angle of inclination of the seat back relative to the seat cushion in the seat-forming position.

Accordingly, it is a primary object of the present invention to provide a new and improved seat arrangement enabling a vehicle seat back to be folded forwardly for access to the space behind the seat and also variably inclinably adjusted in a seat-forming position.

Another object of the present invention is to provide new and improved means of adjustably positioning a seat back relative to a seat cushion.

A further object of the present invention is to combine seat back folding mechanism and seat back adjusting mechanism in a new and improved manner utilizing a minimum of parts and requiring a minimum of space.

The objects and advantages of the invention are attained by use of the inventive principles hereinafter described in detail by reference to the accompanying drawings wherein:

FIGURE 1 is a perspective view of an illustrative vehicle seat arrangement in which the inventive principles may be embodied;

FIGURE 2 is a partial front elevational view of the framework of the vehicle seat shown in FIG. 1;

FIGURE 4 is a partial top view of the framework of one of the vehicle seat backs shown in FIG. 1;

FIGURE 5 is a sectional view taken along the line 5—5 in FIG. 2;

FIGURE 6 is a sectional view taken along the line 6—6 in FIG. 5;

FIGURE 7 is a sectional view taken along the line 7—7 in FIG. 3;

FIGURE 8 is a sectional view taken along the line 8—8 in FIG. 2;

FIGURE 9 is a partial side elevational view of the apparatus shown in FIG. 3 in an alternative adjusted position; and FIGURE 10 is a partial sectional view of the apparatus shown in FIGURE 5 in an operational position.

Figure 3:
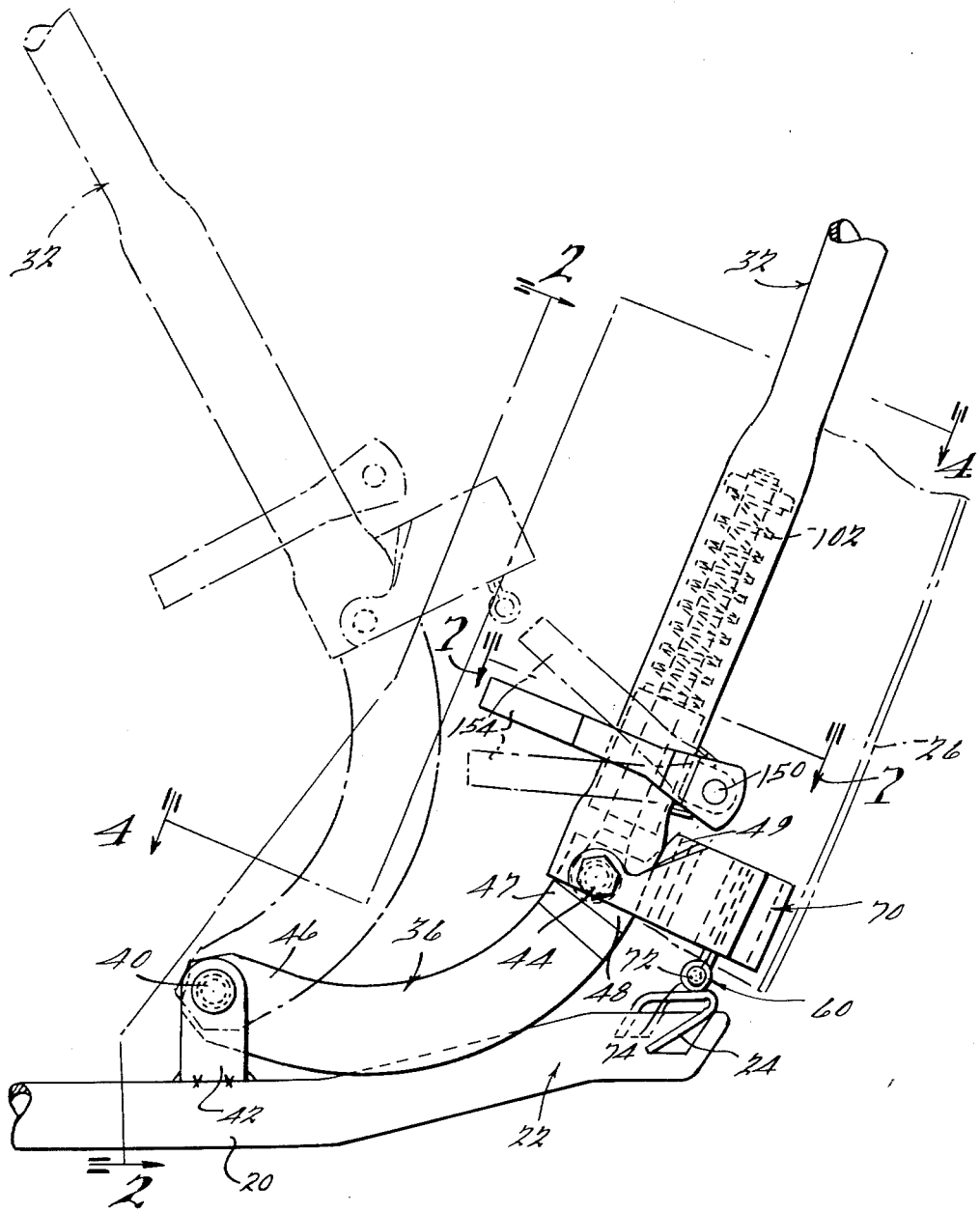
FIGURE 3 is a side elevational view taken in the direction of the arrow 3 in FIG. 2.

Referring now to FIGURE 1 of the drawings, a conventional vehicle seat arrangement is illustrated comprising a seat cushion 10 and a pair of seat backs 12, 14 which are adapted to be pivotally folded forwardly as shown by the seat back 12 and inclinably adjusted rearwardly as shown in phantom at 16. The principles of the present invention are embodied in seat frame and seat back adjusting mechanism as hereinafter described in detail. Although the invention is hereinafter described by reference to the illustrative seat arrangement of FIG. 1, it is to be understood that other seat arrangements, such as bucket seats, for example, are equally well suited for utilization of the inventive principles.

Referring now to FIGURES 2, 3, and 4, side rails 20, 21 of the seat cushion frame are shown at the sides of the framework. It should be understood that the seat cushion frame incorporates such other structural members as are needed to adequately support the seat, and mount or connect the seat to the floor of a vehicle. The seat cushion frame includes a rearwardly extending U-shaped frame member 22 which is provided with suitable abutments or stop plates 24, 25 adapted to receive and support the seat back in the seat forming position. Conventionally, two spaced stops or abutments are provided beneath each seat back adjacent the side edges of the seat back.

An intermediate frame 30 connects the seat cushion frame to the seat back frame 32. The intermediate frame has a U-shaped design, in plan view of FIG. 4, formed by a back bar 34 and spaced pivot arms 36, 38. The ends of the pivot arms 36, 38 are pivotally connected at 40, 41 to suitable bracket means 42, 43 mounted on the seat cushion frame side rails 20, 21.

In side elevation as shown in FIGURES 3 and 9, the pivot arms 36, 38 are in the form of upwardly curved links pivoted at 40, 41 and 44, 45. Pivots 44, 45 form a connection between the intermediate frame 30 and the seat back frame 32. In front elevation as shown in FIG. 2, the pivot arms of the intermediate frame 30 comprise a series of inwardly and upwardly offset portions 46, 47, 48. The pivot arms are connected to the back bar 34 by rearwardly and downwardly extending portions 49, as shown in FIGS. 2, 3 and 9, in the seat forming position. The intermediate frame 30 is also connected to the seat cushion frame 22 by spaced hinge means 60, 62 as shown in FIG. 3.

Referring now to FIGURES 2, 3, 4 and 9, the front plates 64, 65 of each hinge means are fixedly secured to the rear of the back bar 34 and the rear plates 66, 67 of each hinge means are fixedly secured to a U-shaped back bar 70 which forms part of the seat back frame and is similar in shape and extends across the seat back substantially parallel to the intermediate frame as shown in FIG. 4. Each hinge comprises a hinge pin 72 and hinge housing 74 formed at the ends of the hinge plates which are adapted to abut and be received on the stop plates 24, 25. The hinge means 60, 62 permit movement of the back bar 70 relative to the intermediate frame as shown in FIG. 9.

Seat back position adjustment means are provided between the intermediate frame 30 and the seat back frame 32. The adjustment means comprises a slide rod 90 having a flattened end portion 92 pivotally connected to the intermediate frame at 44. The slide rod 90 extends upwardly through a control housing 96 and is provided with a spring stop 98 and a suitable retainer 100 at its upper end. A compression spring 102 is concentrically mounted about the upper end of slide rod 90. One end of the compression spring is seated on the stop 98 and the other end is seated on an end cap 104 mounted in the control housing 96.

The control housing is slidable on the rod 90 from a lowermost position thereon, shown in FIG. 3 when the seat back is in its normal seat forming position, to a plurality of upwardly adjusted positions providing various angles of inclination of the seat back rearwardly from the normal seat forming position. The compression spring 102 exerts a bias on the control housing 96 tending to maintain the control housing in the lowermost position on the slide rod. The control housing 96 is fixedly secured to the lower end of the adjacent seat back frame 32 at 108 as shown in FIG. 6. The extreme lower end of the seat back frame 32 is fixedly secured to the seat back bar 70 by a suitable fastening means 110. In the preferred embodiment, the control housing 96 takes the form of a cylindrical sleeve member closed at one end by the cap 104 and at the other end by a similar cap 114. Integrally formed hubs 115, 116 are provided in the end caps and slidably receive the slide rod 90. Referring now to FIGS. 3, 5 and 10, each end of the housing 96 is provided with a pair of circumferentially oppositely located slots 117, 118 and 120, 122. The slots 118 and 122 have an axial depth substantially greater than the axial depth of the slots 117, 120. The axial depths of all the slots are greater than the depths of the end caps 104, 114 so that aligned opposite openings are defined by the slide housing, the slots, and the end caps.

Locking means are provided in and carried by the slide housing to fixedly secure the slide housing relative to the slide rod in a plurality of adjusted positions. In the preferred embodiment, the locking means take the form of spaced groups 130, 132 of friction discs which have, as shown in FIG. 6, substantially annular body portions 134. The outer diameter of the body portions are approximately equal to the inner diameter of the slide housing 96. A central control hole 138 has a diameter slightly larger than the diameter of the rod 90 to slidably receive the rod therein. Circumferentially oppositely located tabs 140, 142 extend radially outwardly from the body portions and are received within the slots 117, 118 and 120, 122, respectively. Tabs 140 are adapted to be pivotally supported in the slots 117, 120 between the bottom edges of the slots and the adjacent surfaces of the end caps 104, 114. The opposite tabs 142 are adapted to extend outwardly through the slots 118, 122 a substantial distance and are supported on oppositely inclined control surfaces 143, 144 of a cam block 145. The cam block control surfaces are oppositely inclined and located relative to the ends of the slots so that the disc members 130, 132 normally lie at oppositely inclined angles relative to the axis of the slide rod. Spring means 146, 148 in the form of bell-shaped washers or the like, are mounted between the end caps 104, 114 and the disc members 130, 132 to bias the disc members to the inclined positions shown in FIG. 5. The control cam 145 is fixedly mounted on a pivot shaft 150, seen in FIGS. 5, 7, and 10 which is connected at its other end to an actuating lever 152 having a handle portion 154. The control handle 154 and the cam 145 are pivotally supported on a flange 156 integrally formed on the housing 96 as shown in FIG. 7.

Referring now to FIG. 5, it may be seen that the diameter of the holes in the discs relative to the diameter of the slide rod 90, and the spacing of the discs in the slots in the slide housing, is such that, when the control cam surfaces 143, 144 are in the neutral position shown, the discs lie at an angle sufficient to frictionally engage portions of the edges of the control holes with the slide rod. Thus, a portion of the lower edges of the bank of control discs 130 frictionally engage the rod along one side portion as indicated at 162 and portions of the uppermost edges of the same control discs frictionally engage opposite side portions of the rod as indicated at 164. Similarly, but reversely, portions of the lowermost edges 166 of the bank of control discs 132 frictionally engage portions of the slide rod 90 opposite the portions of the uppermost edges of the control discs 132 as indicated at 168. Consequently, it may be seen that downward movement of the slide housing 96 relative to the slide rod is opposed by the disc edges at 166, 168. Correspondingly, upward movement of the slide housing 96 relative to the slide rod 90 is opposed by the disc edges at 164 and at 162. In this manner an effective binding action is obtained between the discs and the slide rod to prevent sliding movement of the slide housing relative to the slide rod. Accordingly the seat back position is fixed relative to the intermediate frame 30.

Adjustment of the seat back is attained by rotating the handle 154 upwardly or downwardly to release the biting edges 162, 164, or 166, 168 from engagement with the slide rod which permits the slide housing 96 to move relative to the slide rod. Movement of the slide housing is accommodated by the pivotal connections 44 of the slide rod to the intermediate frame 30 and the pivotal action of the hinges 60, 62. During all positions of adjustment, the seat back continues to be supported on the stops 24, 25 by provision of the hinges 60, 62, which have the hinged pins and housing in constant engagement on the stops. When the slide housing moves downwardly relative to the slide rod, the seat back moves toward the normal upright vertical position. When the slide housing moves upwardly relative to the slide rod, the seat back is rearwardly inclined away from the normal seat forming position.

As may be seen in FIG. 10, rotative movement of the cam block 145 in one direction causes straightening of the bank of discs 130 and substantial alignment of the surfaces of the control holes with the adjacent surfaces of the slide rod and removal of the edges 162, 164 from fractional biting engagement with the slide rod. Rotative movement of the cam block in the opposite direction causes a similar straightening of the control discs 132 and alignment of the control surfaces in the holes with the adjacent surfaces of the slide rod. When the upper banks of control discs 130 have been straightened, the slide housing 96 can move upwardly on the slide rod since the edges 166, 168 provide the only effective resistance and upwardly exerted forces will cause the edges to be moved away from the slide rod against the bias of the spring element 148. Downward movement of the slide housing relative to the slide rod is prevented since the edges 166, 168 have a biting engagement with the rod and the spacing of the bank of discs between the end cap 114 and the bottom of the slot 120 does not permit any displacement to accommodate such movement. Similarly, when the bank of discs 132 are straightened by rotative movement of the cam block 145 in the opposite direction, the biting edges 162, 164 of the bank of discs 130 effectively prevent upward movement of the slide housing relative to the slide rod whereas the biting edges 162, 164 are movable away from the slide rod against the spring 146 to permit downward movement of the slide housing relative to the slide rod. Although positive control of direction of movement is preferable, the cam block 145 might be designed to effectively simultaneously open both passages in the banks of discs 130, 132 so that there would be no effective resistance to movement in either direction.

Since the inventive principles have been described by reference to an illustrative seat design and since various components of the seat frame, hinge and adjustment mechanisms may be altered and modified in a variety of ways, it is intended that the scope of the invention as defined by the appended claims include all those modifications and variations which utilize the inventive principles, except insofar as limited by the prior art.

I claim:

1. In a seat arrangement comprising a seat and a seat back movable relative thereto between an upright seat forming position and a forwardly folded rear entry position, a seat frame, a seat back frame, an intermediate frame pivotally connected to said seat frame at one end thereof, and hinge means pivotally connecting said seat back frame to said intermediate frame at the other end thereof, whereby said seat back frame may move between said upright seat forming position and said forwardly folded rear entry position and whereby said seat back frame may move relative to said intermediate frame to allow movement of said seat back frame between variously adjusted rearwardly inclined seat forming positions.

2. In a vehicle seat or the like, a seat frame, a seat back frame, an intermediate frame, first pivotal means connecting said intermediate frame to said seat frame, second pivotal means connecting said intermediate frame to said seat back frame for allowing pivotal movement of said seat back frame between variously adjusted rearwardly inclined seat forming positions, said first pivotal means connecting said intermediate frame to said seat frame for allowing pivotal movement of said seat back frame from an upright seat forming position to a forwardly folded rear entry position.

3. The seat arrangement as defined in claim 2 including stop means connected to said seat frame and engageable with said second pivotal means when said seat back frame is in said upright and all of said rearwardly inclined seat forming positions for supporting said seat back when in said last-mentioned positions.

4. The apparatus as defined in claim 3 wherein said second pivotal means includes hinge means pivotally connecting said seat back frame to said intermediate frame and limiting the forward pivotal movement of said seat back frame relative to said intermediate frame, and said hinge means being engageable with said stop means for supporting said seat back frame when in said upright and all of said rearwardly inclined seat forming positions.

5. In a vehicle seat or the like, a seat frame, a seat back frame, an intermediate frame, first means pivotally connecting said intermediate frame to said seat frame, second means pivotally connecting said intermediate frame to said seat back frame for allowing pivotal movement of said seat back frame between variously adjusted rearwardly inclined seat forming positions, said first means pivotally connecting said intermediate frame to said seat frame for allowing pivotal movement of said seat frame from an upright seat forming position to a forwardly folded rear entry position, and control means operatively interconnecting said intermediate frame and said seat back frame for controlling movement of said seat back frame relative to the said intermediate frame between various adjusted rearwardly inclined positions.

6. The invention as defined in claim 5 and wherein said control means slidably connects said seat back frame to said intermediate frame during pivotal movement of said seat back frame relative to said intermediate frame, and includes latch means for selectively preventing said pivotal movement of said seat back frame in various adjusted positions.

7. The invention as defined in claim 5 wherein said control means comprises: a slide means, a housing slidably mounted on said slide means, spaced control disc means slidably mounted on said slide means and carried by said housing, means normally holding said control disc means in an inclined relationship relative to said slide means, portions of said spaced control disc means being in frictional holding engagement with said slide means when said control disc means are in said inclined relationship, and release means mounted in said housing between said spaced control disc means and selectively engageable with said disc means for moving said disc means from frictional holding engagement with said slide means to permit movement of said seat back frame back.

8. The apparatus as defined in claim 5 and wherein said control means comprises: a slide means, a housing slidably mounted on said slide means, spaced control disc means slidably mounted on said slide means and carried by said housing, means normally holding said spaced control disc means in an inclined relationship relative to said slide means, portions of said spaced control disc means being in frictional holding engagement with said slide means when said control disc means are in said inclined relationship, one of said spaced control disc means being inclined relative to said slide means in one direction to prevent movement of said housing relative to said slide means in one direction and the other of said spaced disc means being inclined relative to said slide means in the opposite direction to prevent movement of said housing relative to said slide means in the opposite direction, and release means mounted in said housing and engageable with said spaced disc means to move a selected one of said spaced disc means from frictional holding engagement with said slide means to permit adjustment of said seat back in one direction while preventing adjustment of said seat back in the opposite direction.

9. In a control mechanism for variously adjusting the pivotal movement of a seat back relative to a seat, a slide rod pivotally connected at one end to said seat, a housing mounted on said slide rod for reciprocable movement thereon, means connecting said housing to said seat back, and means for positioning said housing along said slide rod to selectively position said seat back relative to said seat including frictional gripping means adapted, in a first position, to prevent movement of said housing relative to said slide rod, and release means to change the relationship between said gripping means and said slide rod from said first position to permit movement of said housing along said slide rod in one direction and preventing movement of said housing along said slide rode in the opposite direction, and said release means being further movable to a third position permitting movement of said housing along said slide rod in said opposite direction and preventing movement of said housing in said one direction.

10. In a vehicle seat or the like, a seat frame, a seat back frame, an intermediate frame pivotally connnected to said seat frame, hinge means connecting said intermediate frame to said seat back frame and engageable with said seat frame for providing a supporting stop for said seat back frame when said seat back frame is in an upright position and any one of various rearwardly inclined adjusted positions, and control means to rearwardly inclinably adjust said seat back frame relative to said intermediate frame.

11. In an adjusting control for rearwardly inclining a vehicle seat back relative to a seat, a slide rod pivotally connected at one end to said seat, slide means connected to said seat back and slidably mounted on said slide rod, said slide means including disc means, a plurality of control surfaces formed on said disc means and spaced closely adjacent said slide rod, said control surfaces being movable between positions of frictional engagement with said slide rod to positions permitting sliding movement of said slide rod relative to said control surfaces, and release means to selectively move said control surfaces to allow one-way sliding movement in a selected direction of said slide means relative to said slide rod.

12. The invention as defined in claim 11 wherein said slide means includes; a housing having a central aperture adapted to slidably receive said slide rod, aligned slot means formed on opposite sides of said housing for receiving and movably retaining said disc means, and cam means mounted on said housing for moving said disc means in said slot means to change the relationship of said disc means relative to said slide rod from said positions of frictional engagement with said slide rod and positively locating said slide means relative thereto to said positions permitting sliding movement of said slide rod.

13. The invention as defined in claim 12 and having spring means mounted in said housing in biasing engagement with said disc means to normally maintain said disc means in said positions of frictional engagement with said slide rod and permitting said disc means to be moved to said positions permitting sliding movement of said slide rod upon actuation of said cam means.

14. The invention as defined in claim 12 and wherein said cam means includes a pair of cam surfaces, said cam surfaces being inclined at an angle relative to one another, and said disc means being seated on said surfaces and supported thereby in an inclined relationship relative to said slide rod to cause frictional holding engagement of said disc means with said slide rod when said surfaces are equally inclined relative to the axis of the slide rod and permitting movement of said disc means relative to said slide rod in a selected direction when the angle of inclination of said surfaces relatives to the axis of said slide rod is changed.

15. In a seat arrangement, a seat frame, a seat back frame movable relative to said seat frame, intermediate frame means connecting said seat frame to said seat back frame, said intermediate frame means being substantially U-shaped and defined by spaced pivot arms and a connecting back bar, said pivot arms being pivotally connected to said seat frame and upwardly and rearwardly curved in side elevation, said back bar extending downwardly and rearwardly, hinge means connecting said back bar to said seat back frame for limiting the forward pivotal movement of said seat back frame relative to said intermediate frame, and adjustment means for rearwardly pivoting said seat back frame about said hinge means relative to said seat frame and said intermediate frame.

16. A reclining-backed seat assembly comprising: a seat frame; a pair of spaced arms pivotally connected to said seat frame; a substantially U-shaped bar connected at each end thereof to said respective arms; a pair of spaced hinges each connected by one leaf thereof to said bar; a support means attached to said seat frame for engaging the respective hinges to provide a stop for the pivotal movement of said arms and back bar in one direction; a seat back frame; a back bar connected at its respective ends to each side of said seat back frame; and said hinges being respectively connected to said back bar by the second leaf thereof to allow said seat back frame to rotate relative to said arms and said seat frame to any one of a plurality of reclining positions, and for limiting said rotation of said seat back frame in an upright position as the first leaf and the second leaf of each respective hinge abut one another.

17. In a vehicle seat or the like, a seat frame, a seat back frame, means pivotally connecting said seat back frame to said seat frame, control means for controlling the pivotal movement of said seat back frame relative to said seat frame including first and second members adapted for movement relative to one another, said first member being pivotally connected to said seat frame, said second member being pivotally connected to said seat back frame, one of said members having friction means slidable along and normally in frictional engagement with the other of said members for preventing movement between said members, and means for selectively moving said friction means out of said frictional engagement for allowing relative movement between said members to allow pivotal movement of said seat back frame relative to said seat frame.

18. In a vehicle seat or the like, a seat frame, a seat back frame, means pivotally connecting said seat back frame to said seat frame, control means for controlling the pivotal movement of said seat back frame relative to said seat frame including first and second members adapted for movement relative to one another, said first member being pivotally connected to said seat frame, said second member being pivotally connected to said seat back frame, one of said members having a plurality of discs normally in frictional engagement with the other of said members for preventing relative movement therebetween, and means for selectively moving at least one of said discs out of said frictional engagement for allowing relative movement between said members to allow said seat back frame to pivot relative to said seat frame.

References Cited by the Examiner
UNITED STATES PATENTS

| | | | |
|---|---|---|---|
| 642,010 | 1/00 | Seng | 297—375 |
| 722,439 | 3/03 | Wilsdorf | 297—375 |
| 980,049 | 12/10 | Beyer | 297—375 |
| 1,263,161 | 4/18 | Travers | 297—374 |
| 1,512,834 | 10/24 | Eddy | 297—375 |
| 2,530,264 | 11/50 | Perry | 297—374 |
| 2,799,326 | 7/57 | Liljengren | 297—379 |

FRANK B. SHERRY, *Primary Examiner.*

UNITED STATES PATENT OFFICE
CERTIFICATE OF CORRECTION

Patent No. 3,206,248                           September 14, 1965

Raymond C. Posh

It is hereby certified that error appears in the above numbered patent requiring correction and that the said Letters Patent should read as corrected below.

Column 4, line 23, for "fractional" read -- frictional --; column 5, line 38, for "various" read -- variously --; line 59, strike out "back", second occurrence; column 6, line 20, for "rode" read -- rod --; column 7, line 2, for "relatives" read -- relative --.

Signed and sealed this 10th day of May 1966.

(SEAL)
Attest:

ERNEST W. SWIDER                                 EDWARD J. BRENNER
Attesting Officer                                      Commissioner of Patents